US007260499B2

(12) United States Patent
Watzke, Jr. et al.

(10) Patent No.: US 7,260,499 B2
(45) Date of Patent: Aug. 21, 2007

(54) FUEL DELIVERY SYSTEM WITH ENHANCED FUNCTIONALITY AND DIAGNOSTIC CAPABILITY

(75) Inventors: Donald Edward Watzke, Jr., McFarland, WI (US); Donald Patrick Kenney, McFarland, WI (US)

(73) Assignee: FE Petro Inc., McFarland, WI (US)

( * ) Notice: Subject to any disclaimer, the term of this patent is extended or adjusted under 35 U.S.C. 154(b) by 0 days.

(21) Appl. No.: 10/224,126

(22) Filed: Aug. 20, 2002

(65) Prior Publication Data

US 2004/0039549 A1 Feb. 26, 2004

(51) Int. Cl.
*G06F 11/30* (2006.01)

(52) U.S. Cl. ...................................... 702/183; 700/282

(58) Field of Classification Search ................. 702/62, 702/68, 90, 91, 93, 104, 116, 122, 138, 183, 702/184, 50, 51; 700/236, 282; 73/276, 73/301, 332
See application file for complete search history.

(56) References Cited

U.S. PATENT DOCUMENTS 3,910,102 A * 10/1975 McLean .................. 73/40.5 R
4,147,893 A * 4/1979 Matson .................. 379/106.07
4,203,099 A * 5/1980 Edwards ..................... 340/619
4,864,857 A 9/1989 Koon ....................... 73/304 C
5,072,621 A 12/1991 Hasselmann ............. 73/40.5 R
5,105,663 A * 4/1992 Kuhlen ........................ 73/308
5,186,138 A * 2/1993 Hashimoto ........... 123/198 DB
5,319,545 A * 6/1994 McGarvey et al. ........... 705/28
5,361,216 A 11/1994 Warn et al. ................. 700/283
5,363,093 A 11/1994 Williams et al. ............ 340/605
5,376,927 A 12/1994 Kidd .......................... 340/522
5,384,714 A 1/1995 Kidd .......................... 700/282
5,423,457 A * 6/1995 Nicholas et al. .............. 222/62
5,526,679 A 6/1996 Filippi et al. ............ 73/40.5 R
5,577,895 A 11/1996 Franklin et al. ............ 417/238
5,580,221 A 12/1996 Triezenberg ............... 417/44.2
H1676 H 9/1997 Marshall ...................... 340/605
5,757,664 A 5/1998 Rogers et al. .............. 700/232
5,779,097 A 7/1998 Olson et al. .................. 222/39
5,890,718 A 4/1999 Byon ......................... 273/459
5,992,474 A * 11/1999 Miller ......................... 141/59
6,012,438 A * 1/2000 Joos et al. .................. 123/690
6,128,551 A * 10/2000 Davis et al. ............... 700/236
6,213,172 B1 4/2001 Dickson ....................... 141/59
6,259,956 B1 7/2001 Myers et al. ................. 700/80
6,302,165 B1 * 10/2001 Nanaji et al. ................. 141/59

(Continued)

FOREIGN PATENT DOCUMENTS

JP 407286928 A * 4/1994

*Primary Examiner*—Carol S. W. Tsai
*Assistant Examiner*—Mohamed Charioui
(74) *Attorney, Agent, or Firm*—Katten Muchin Rosenman LLP; John S. Paniaguas

(57) ABSTRACT

A control system for a fuel delivery system provides enhanced functionality and diagnostic capabilities relative to known systems. In accordance with one aspect of the invention, enhanced functionality and diagnostic capability is provided by integrating the pump controller and the tank gauge by way of a control or integration unit. The control unit includes a microprocessor and communication hardware for communicating with the tank gauge and the pump controllers. In accordance with alternate embodiments of the invention, a control unit is included which provides additional functionality, such as automatic logging of controller faults.

16 Claims, 10 Drawing Sheets

U.S. PATENT DOCUMENTS

| | | | | |
|---|---|---|---|---|
| 6,336,479 | B1 * | 1/2002 | Nanaji | 141/4 |
| 6,352,176 | B1 * | 3/2002 | Hartsell et al. | 222/1 |
| 6,401,045 | B1 * | 6/2002 | Rogers et al. | 702/51 |
| 6,526,948 | B1 * | 3/2003 | Stavnheim et al. | 123/497 |
| 6,625,519 | B2 * | 9/2003 | Goodwin et al. | 700/282 |
| 2001/0037839 | A1 | 11/2001 | Litt | |

* cited by examiner

*Fig. 9B*
*Fig. 9*
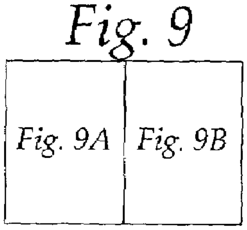
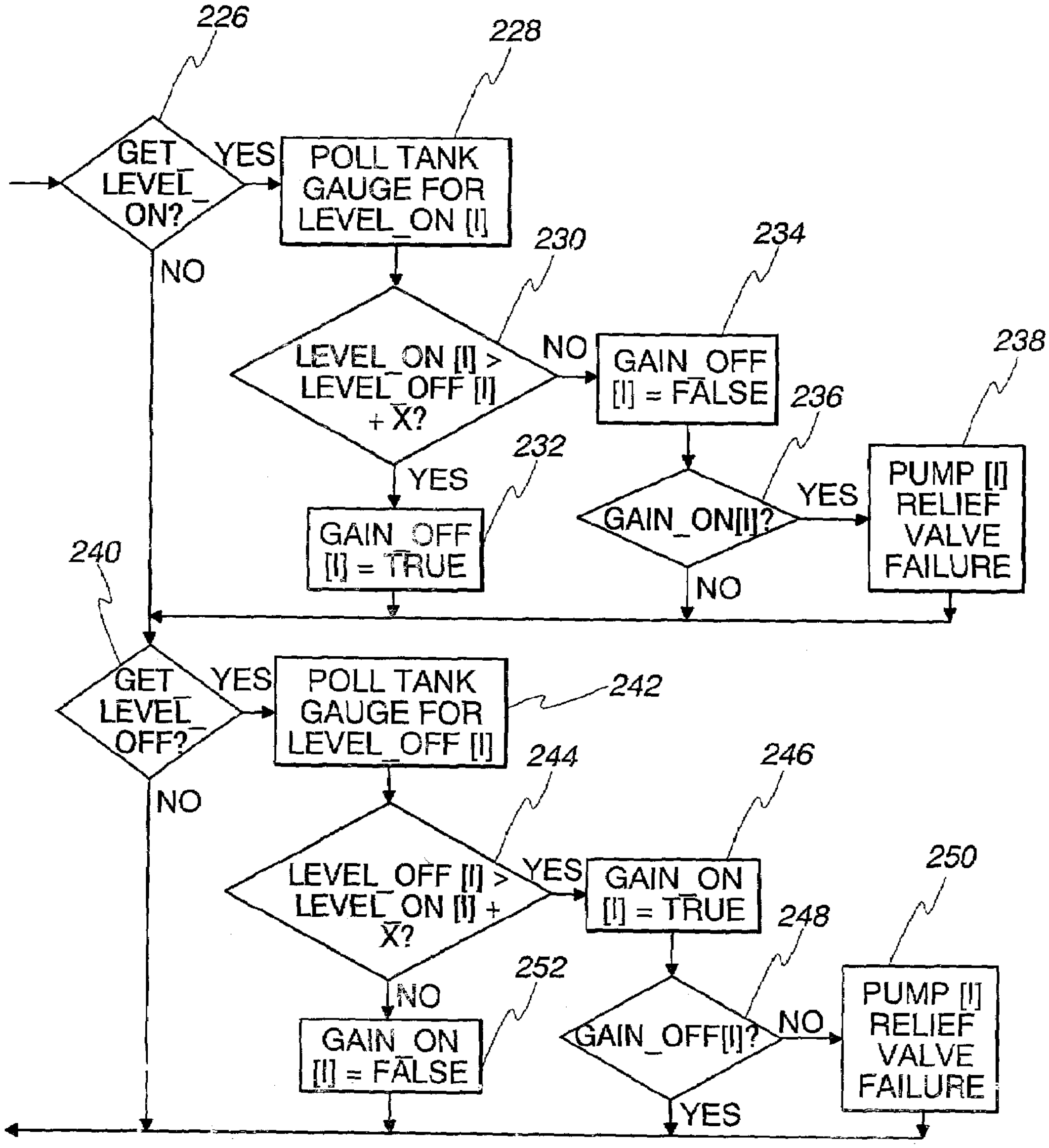

FUEL DELIVERY SYSTEM WITH ENHANCED FUNCTIONALITY AND DIAGNOSTIC CAPABILITY

BACKGROUND OF THE INVENTION

1. Field of the Invention

The present invention relates to a fuel delivery system and more particularly to a control system for a fuel delivery system for use in gasoline service stations which provides enhanced functionality and diagnostic capabilities heretofore unknown.

2. Description of the Prior Art

Retail fuel delivery systems, for example, for dispensing gasoline, are known to include: one or more underground storage tanks for carrying various grades of fuel; a submersible pump disposed within each of said storage tanks for pumping fuel from the storage tank to a dispenser on demand; a level probe and a tank gauge for monitoring fuel level within the tank; and a dispenser which acts as a point of sale (POS) device for dispensing fuel to consumers. A pump controller is provided to run the submersible pump in response to certain signals being present. For example, many known dispensers include credit card readers for enabling a consumer to charge the purchase at the dispenser and enable the pump. In addition, the pump controller can be enabled from a service station attendant for an unspecified amount of purchase or a specified purchase. When one or more enabling signals are present, the pump controllers are under the control of a trigger mechanism disposed at the dispenser. Examples of such fuel delivery systems are disclosed in: U.S. Pat. Nos. 5,361,216; 5,363,093; 5,376,927; 5,384,714; 5,423,457; 5,757,664 and 6,302,165. Fuel delivery systems are also disclosed in published Patent Application No. U.S. 2001/0037839 A1, as well as commonly-owned U.S. Pat. No. 5,577,895, all hereby incorporated by reference.

Due to regulations promulgated by the Environmental Protection Agency over ten years ago, retail fuel delivery systems are now required to include leak detection systems for detecting leaks in the underground storage tanks. As such, a number of leak detection systems for such underground storage tanks are known. Examples of such leak detection systems are disclosed in U.S. Pat. Nos. 5,363,093; 5,376,927; 5,384,714; 5,423,457; 5,526;679; 5,757,664; and 5,779,097, all hereby incorporated by reference.

Other than the leak detection capabilities, the functional as well as the diagnostic capabilities of such fuel delivery systems are relatively limited. In particular, various common operating conditions exist which either go undiagnosed or are relatively difficult to diagnose. For example, conditions are known in which the submersible pump is installed incorrectly in that it is located too far from the bottom of the tank. This condition is often undiagnosed causing the pump controller to indicate that the tank is empty long before the tank gauge indicates a low level alarm resulting in fuel in the bottom of the tank never being used.

Various conditions are also known to exist which result in false alarms. For example, situations are known in which the pump controller is faulted during a leak detection test. During such a condition, a leak is indicated. False leak detection alarms can also be indicated in fuel delivery systems in which the underground tanks are connected together by piping or are "manifolded" and a check or relief valve is stuck in an open position.

In addition to limited and faulty diagnostics, fuel delivery systems are also known to have relatively limited functionality. For example, when a pump controller is faulted, such faults are indicated on the pump controller itself. As such, service station attendants are known to reset the pump controllers without logging the pump controller fault, thus, losing the fault history. Moreover, the pump controllers are normally contained in locked rooms. Thus, the attendants must be given access to the locked rooms to enable the pump controllers to be manually reset. Thus, there is a need for a control system with enhanced functionality and diagnostic capability for fuel delivery systems.

SUMMARY OF THE INVENTION

Briefly, the present invention relates to a control system for a fuel delivery system which provides enhanced functionality and diagnostic capabilities relative to known systems. In accordance with one aspect of the invention, enhanced functionality and diagnostic capability is provided by integrating the pump controller and the tank gauge by way of a control or integration unit. The control unit includes a microprocessor and communication hardware for communicating with the tank gauge and the pump controllers. In accordance with alternate embodiments of the invention, a control unit is included which provides additional functionality, such as automatic logging of controller faults.

DESCRIPTION OF THE DRAWING

These and other advantages of the present invention will be readily understood with reference to the following specification and attached drawing wherein:

FIG. 9A and FIG. 9B are pseudo code listing for faulty relief valve diagnosis in manifold tanks in accordance with the present invention. FIG. 9A and 9B are combined as shown in FIG. 9.

DETAILED DESCRIPTION

The present invention relates a control system for an underground fuel delivery system which provides enhanced functional and diagnostic capabilities relative to known systems. In accordance with one aspect of the invention, the pump controller is integrated with the tank gauge to provide the enhanced functional and diagnostic capability. As will be discussed in more detail below, the fuel delivery system includes a control or integration unit in which one embodiment of the invention communicates with the various pump controllers and tank gauge.

Fuel Delivery System

Figure 1:
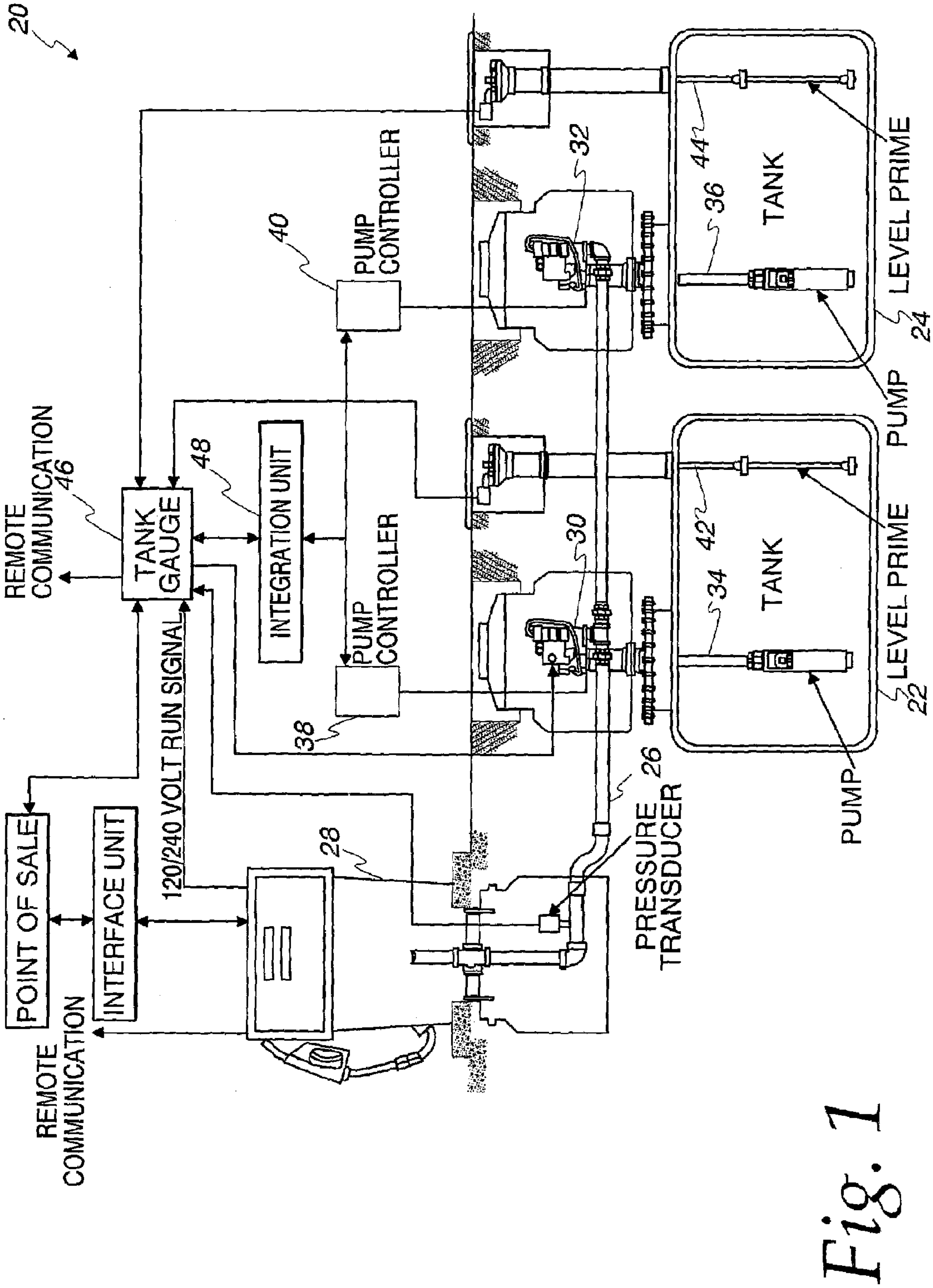
FIG. 1 is a block diagram of a fuel delivery system incorporating a control system in accordance with the present invention, shown with the mechanical components of the fuel delivery system shown physically.

FIG. 1 illustrates an exemplary fuel delivery system and a control system in accordance with the present invention. The fuel delivery system includes one or more underground storage tanks 22, 24, connected together by way of a common manifold 26. The manifold 26, in turn, is connected to a conventional dispenser 28. A solenoid valve 30, 32 is associated with each tank 22, 24, respectively. These solenoid valves 30, 32 are used to insert a calibrated leak in the line. Each tank 22, 24 includes a submersible pump 34, 36, respectively. These submersible pumps 34, 36 are motor operated pumps whose motors are controlled by respective pump controllers 38, 40. The submersible pumps 34, 36 may be, for example, Model No. STP150-VL2, available from FE Petro of McFarland, Wis. The connections to the submersible pumps 34, 36 can be, for example, as disclosed in commonly owned U.S. Pat. No. 5,577,895. The pump controllers 38, 40 may be, for example, a Model No. STP-SC, also available from FE Petro as discussed above.

In order to monitor the level of fuel in the underground storage tanks 22, 24, tank level probes 42 and 44 are provided. These tank level probes 42, 44 may be magnetorestrictive type probes, which are connected to a tank gauge 46 to indicate the fuel level within the tanks 22 and 24. The tank gauge 46 may be, for example, Incon TS-2001, available from Intelligent Controls, Inc., Saco Me.

Integration Unit

In accordance with an important aspect of the invention, a control or integration unit 48 is provided, as described in detail below. In one embodiment of the invention, the integration unit 48 is configured to communicate with the pump controllers 38 and 40 as well as the tank gauge 46 to provide enhanced functional and diagnostic capability of the controlled heretofore unknown.

Figure 2:
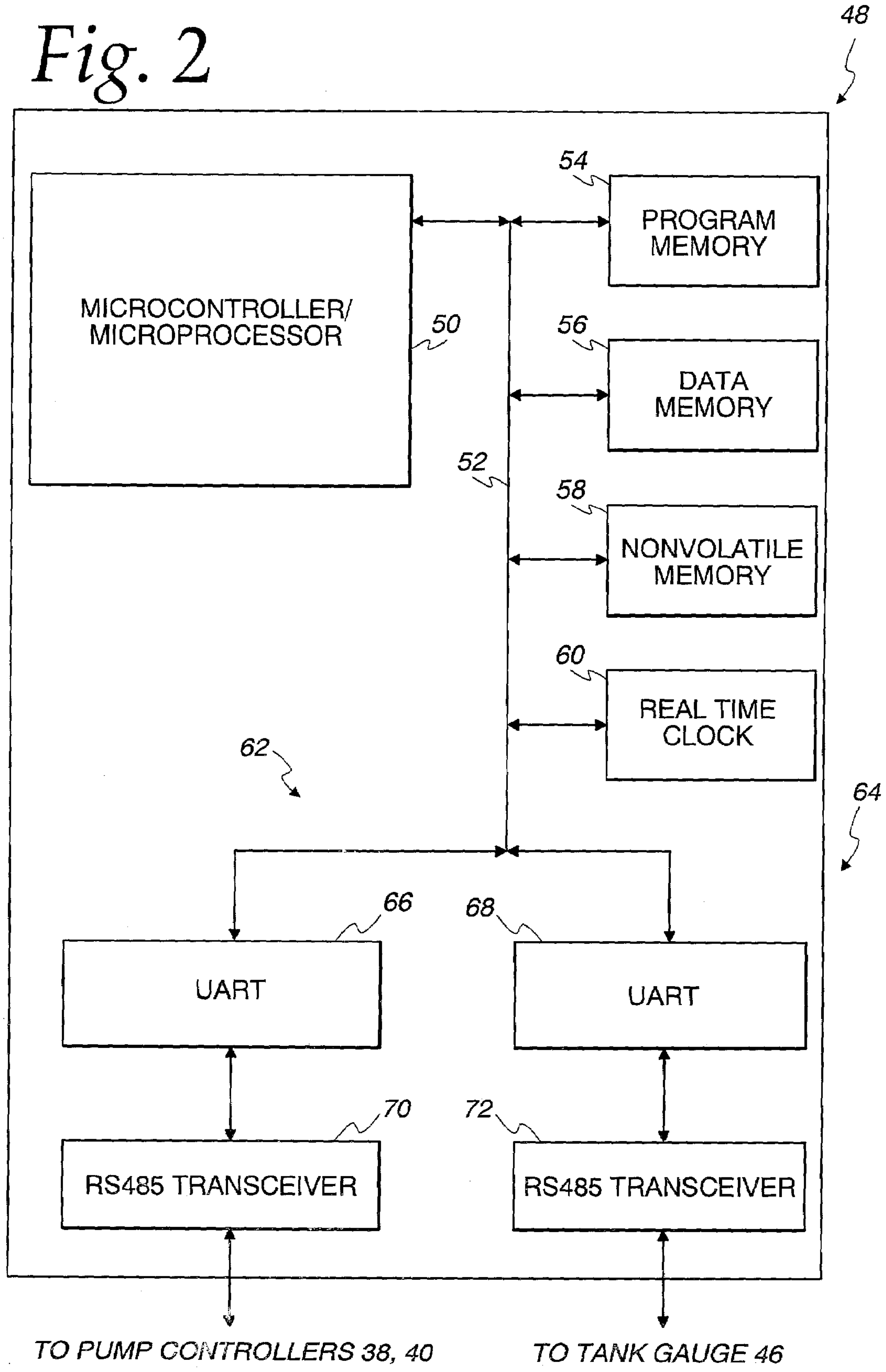
FIG. 2 is a block diagram of an integration unit which forms a part of the present invention.

Turning to FIG. 2, the integration unit 48 includes a microprocessor or microcontroller 50 and a system bus 52. A program memory 54 is coupled to the system bus 52. The program memory may be an electronically erasable programmable read-only memory (EEPROM), FLASH, PROM or ROM. The program memory 54 is used for storing various software programs, for example, as illustrated in FIGS. 3 through 9B.

The integration unit 48 may also include a data memory, for example, a random access memory (RAM) memory 56. The data memory 56 is likewise attached to the system bus 52. A non-volatile memory 58 may also be provided, for example, a EEPROM. The non-volatile memory 58 may be utilized for logging faults to provide a fault history log. In order to associate controller faults with real time, a conventional real time clock 60 may also be provided. The real time clock 60 as well as the non-volatile memory 58 are connected to the system bus 52.

The integration unit 48 may also include a plurality of communication interfaces, generally identified with the reference numerals 62 and 64. As shown, the communication interface 62 is used for providing bi-directional communication to the pump controllers 38, 40 (FIG. 1) while the communication interface 64 is for providing bi-directional communication with the tank gauge 46. The communication interfaces 62, 64 may be configured to include a universal asynchronous receiver transmitter (UART) 66, 68 as well as a RS 485 transceiver 70, 72. As mentioned above, the integration unit 48 integrates the pump controllers 38 and 40 with a tank gauge 46 to provide enhanced functional and diagnostic capabilities heretofore unknown.

Software

Figure 3:
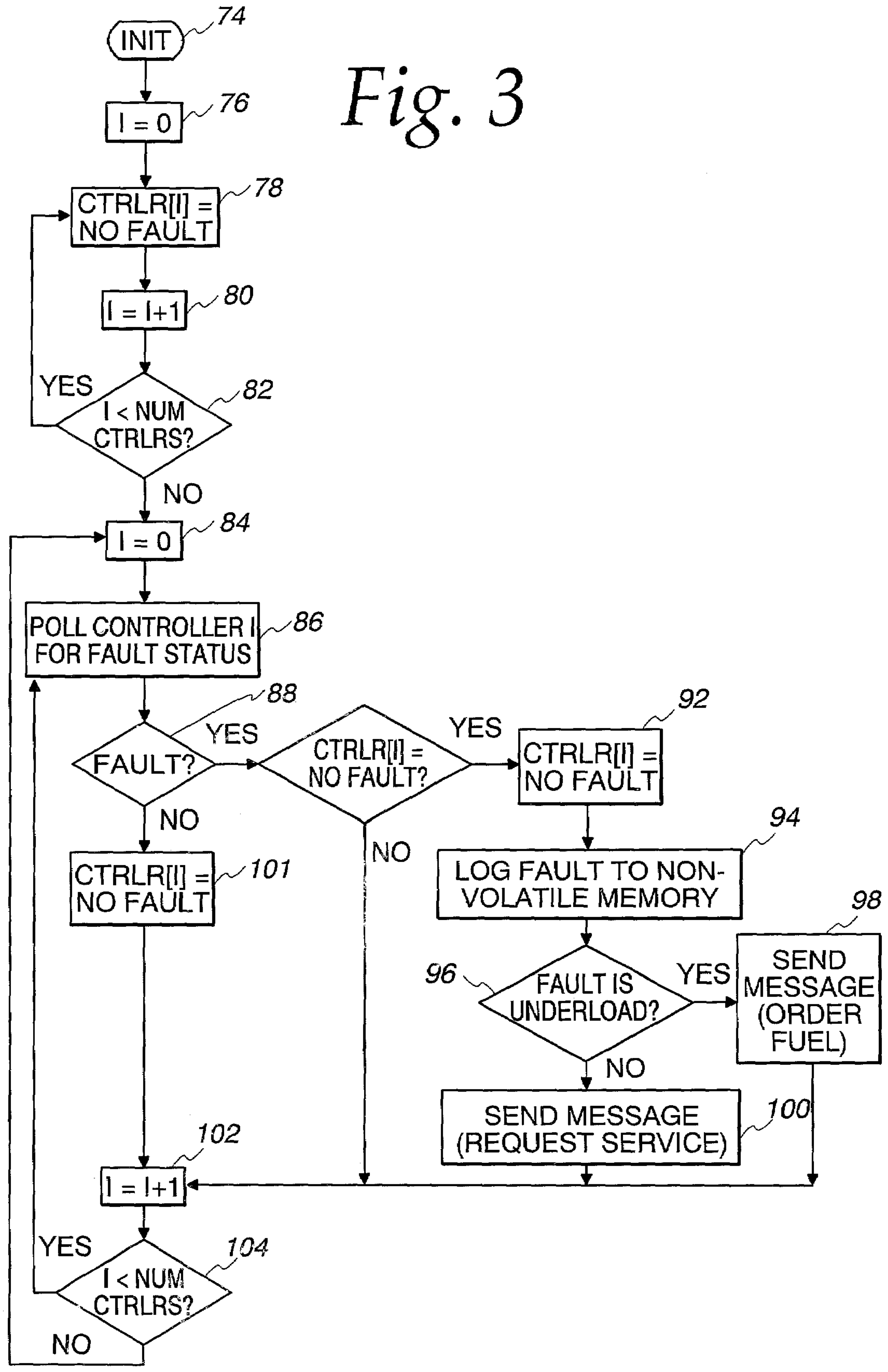
FIG. 3 is a software flow diagram for monitoring pump controller faults.
Figure 4:
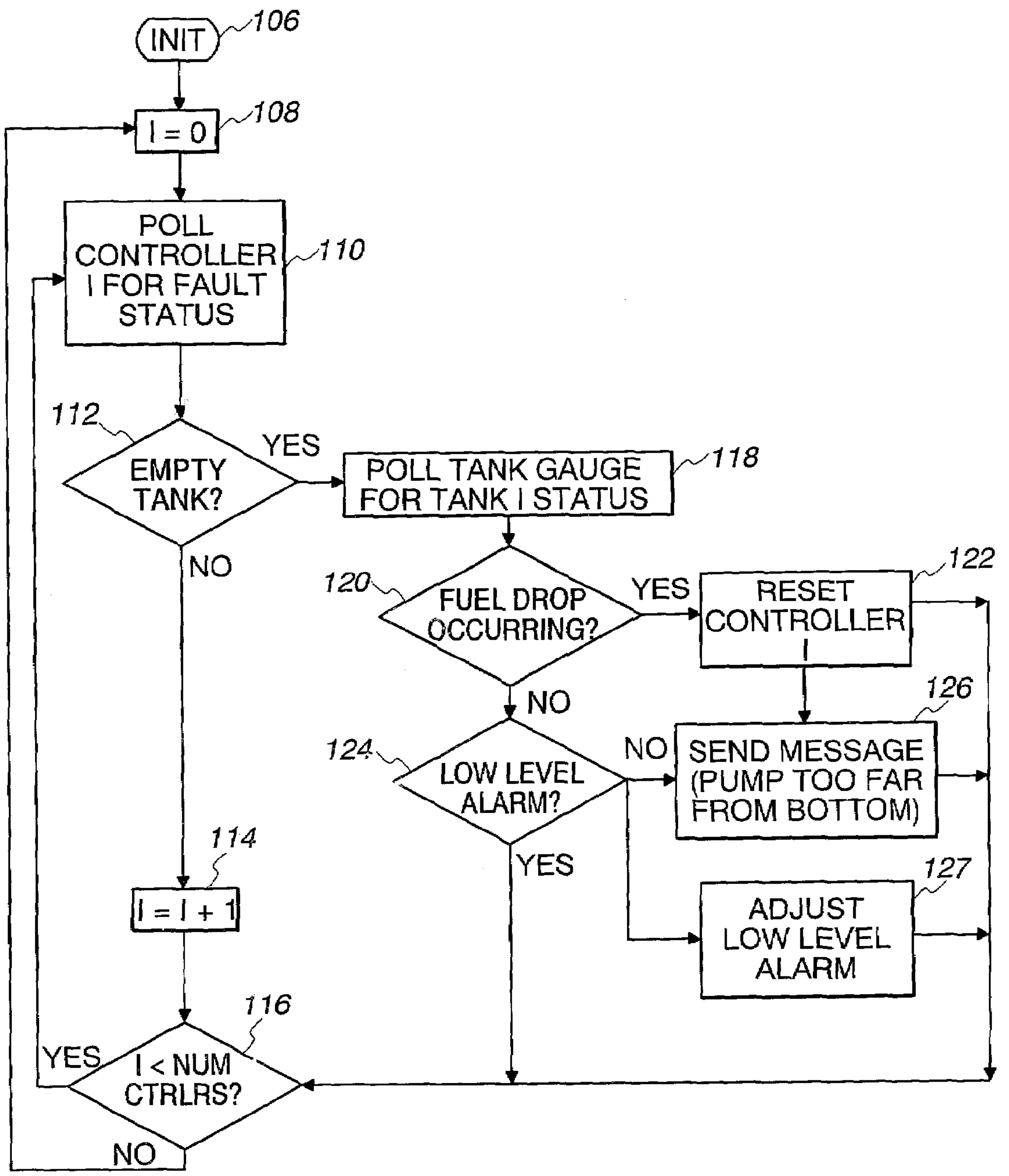
FIG. 4 is a software flow diagram which indicates an automated response to an empty tank fault in accordance with an aspect of the invention.
Figure 5:
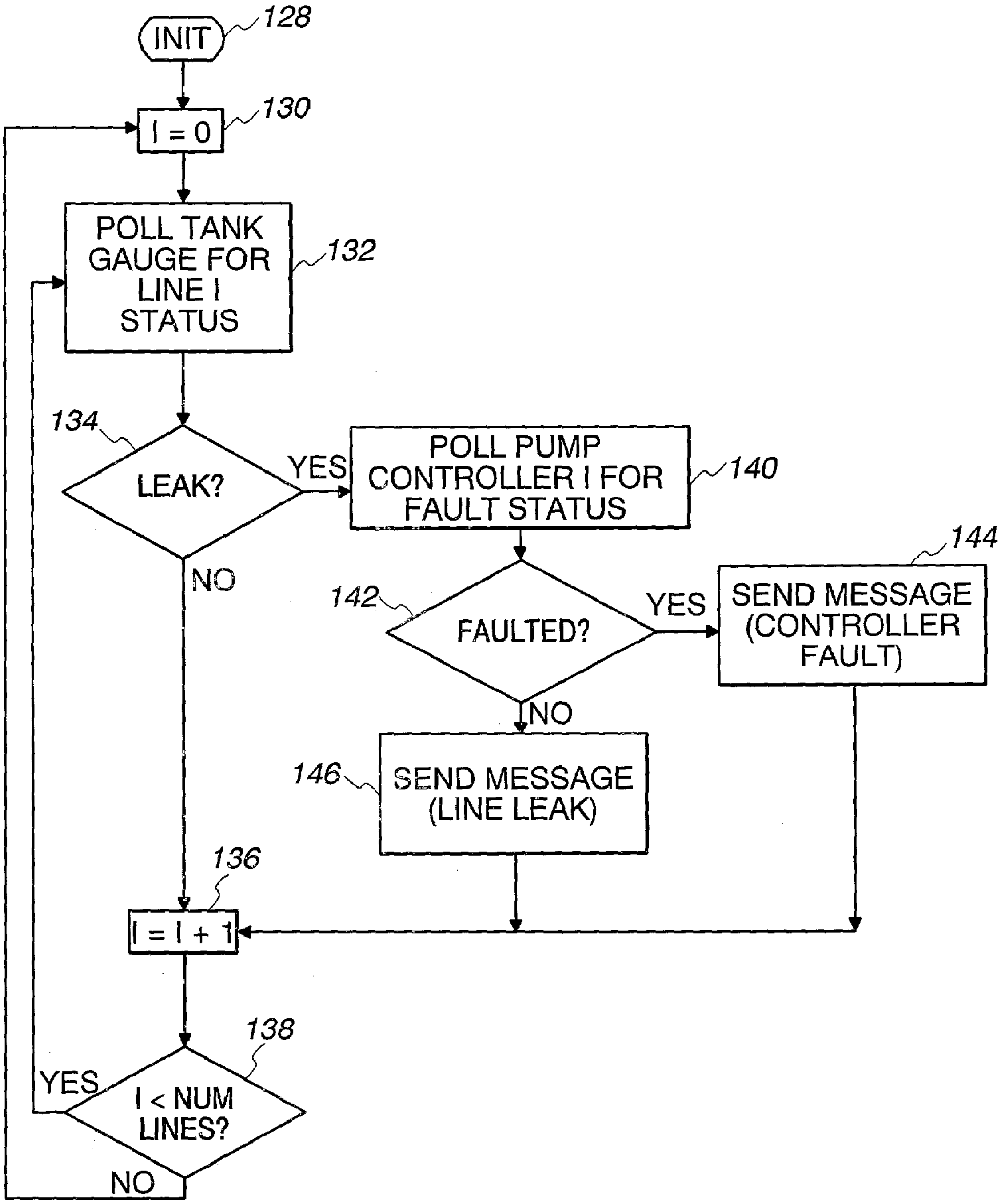
FIG. 5 is a diagram in accordance with another aspect of the invention relating to distinguishing a line leak from a controller fault.
Figure 6:
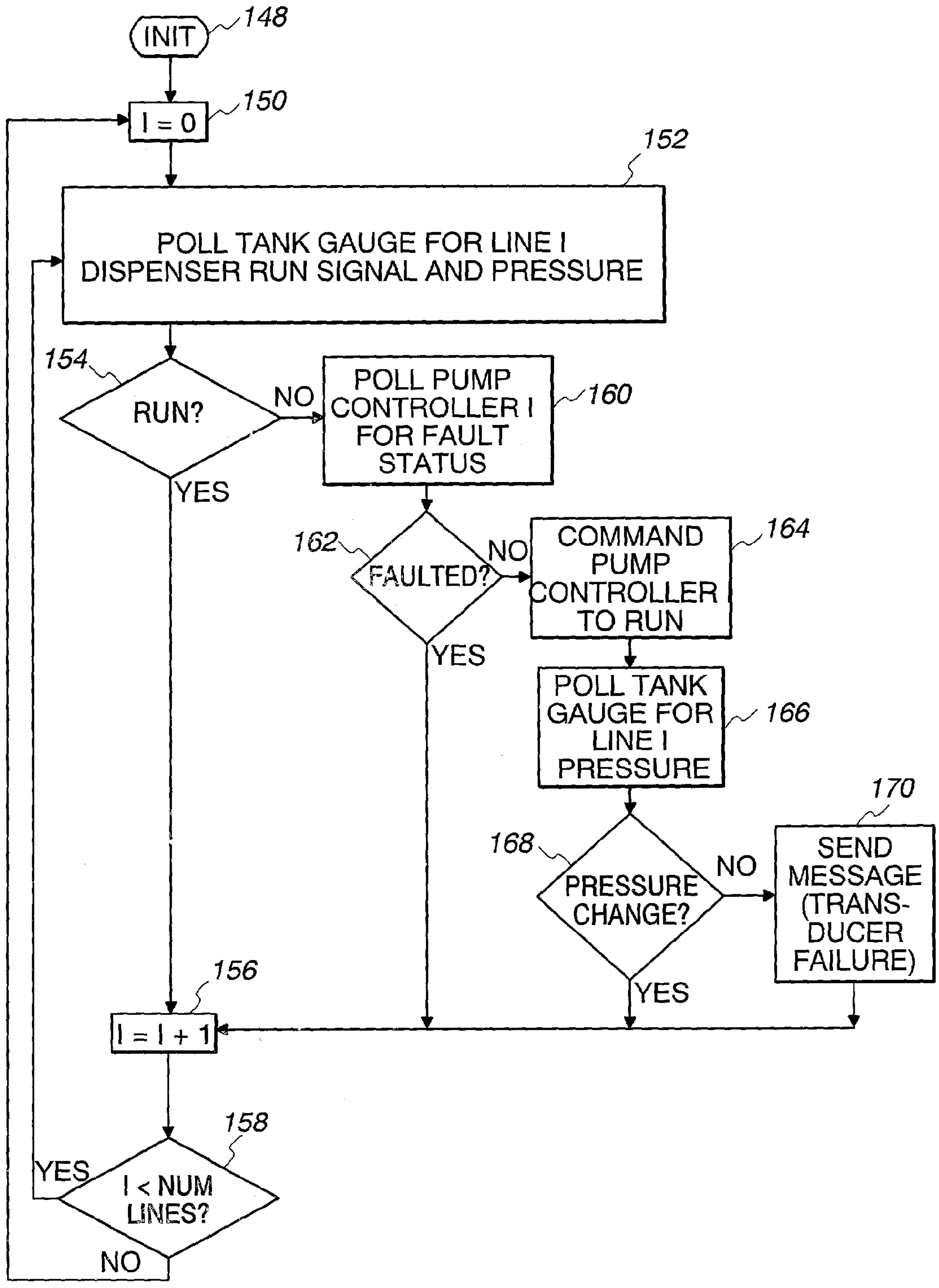
FIG. 6 is a flow diagram of another aspect of the invention related to pressure transducer testing.
Figure 7:
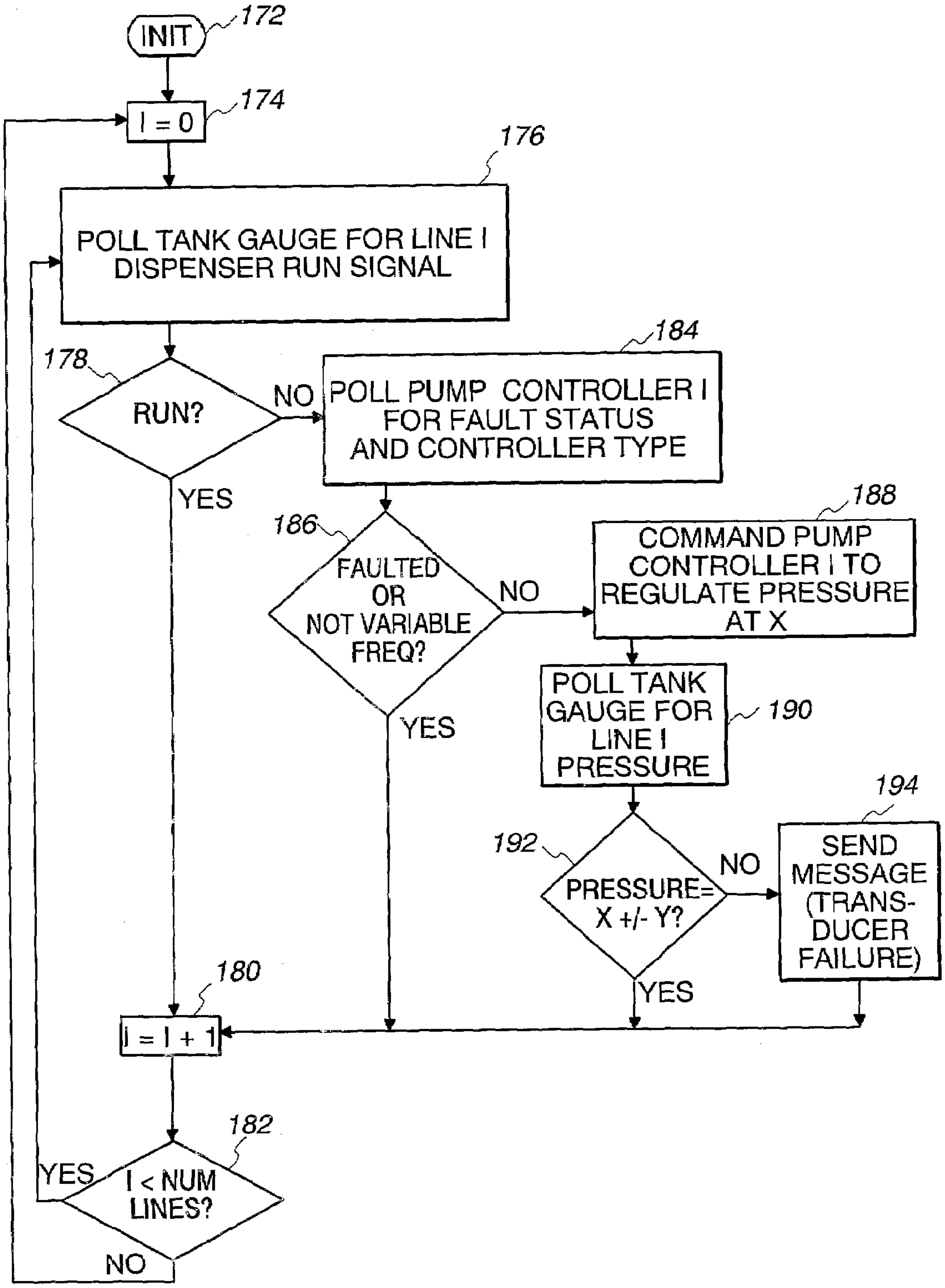
FIG. 7 is a software flow diagram relating to an alternate embodiment of the pressure transducer testing with a variable frequency pump controller in accordance with another aspect of the invention.
Figure 8:
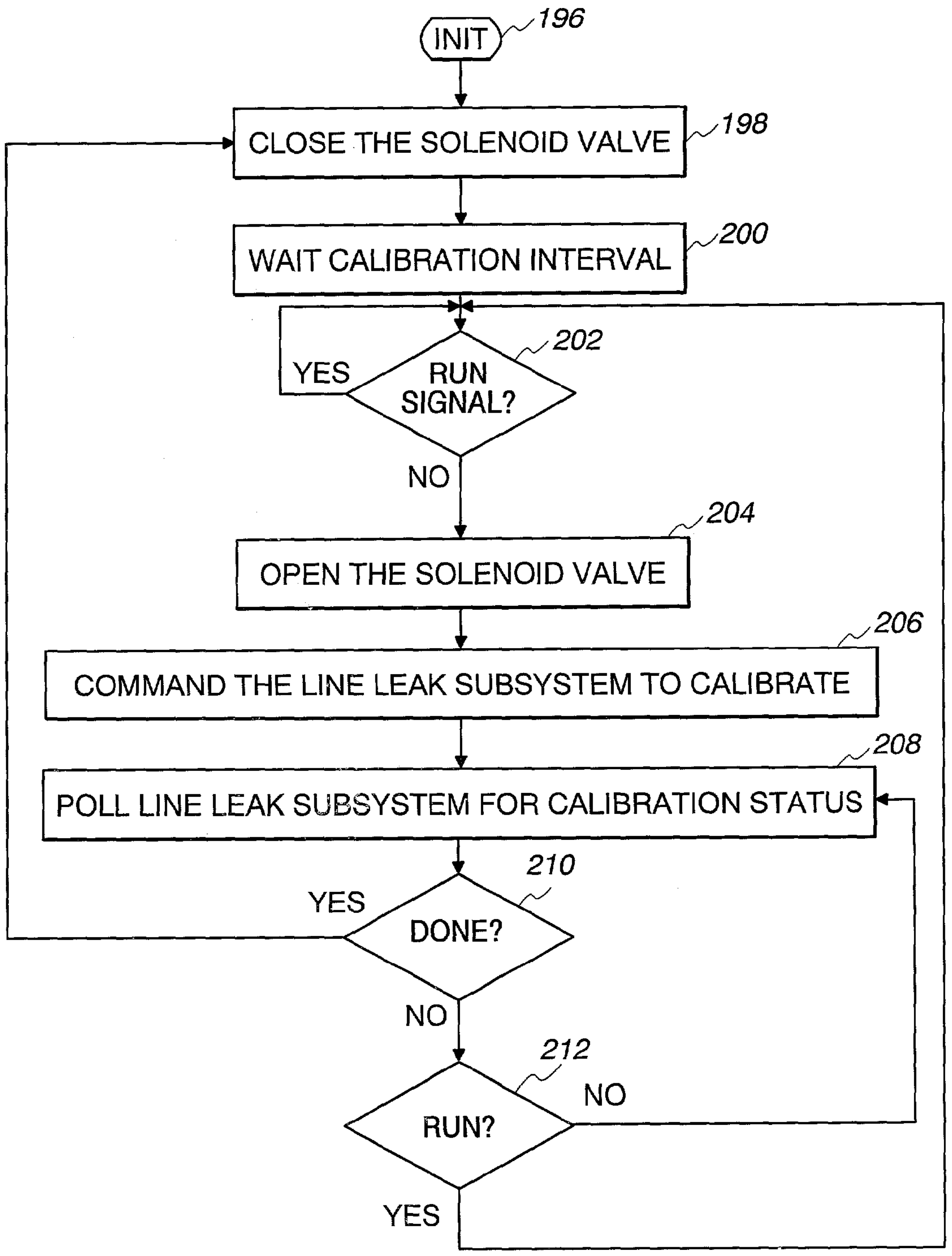
FIG. 8 is a software flow diagram of an automatic line leak calibration system in accordance with another aspect of the invention.
Figure 9A:
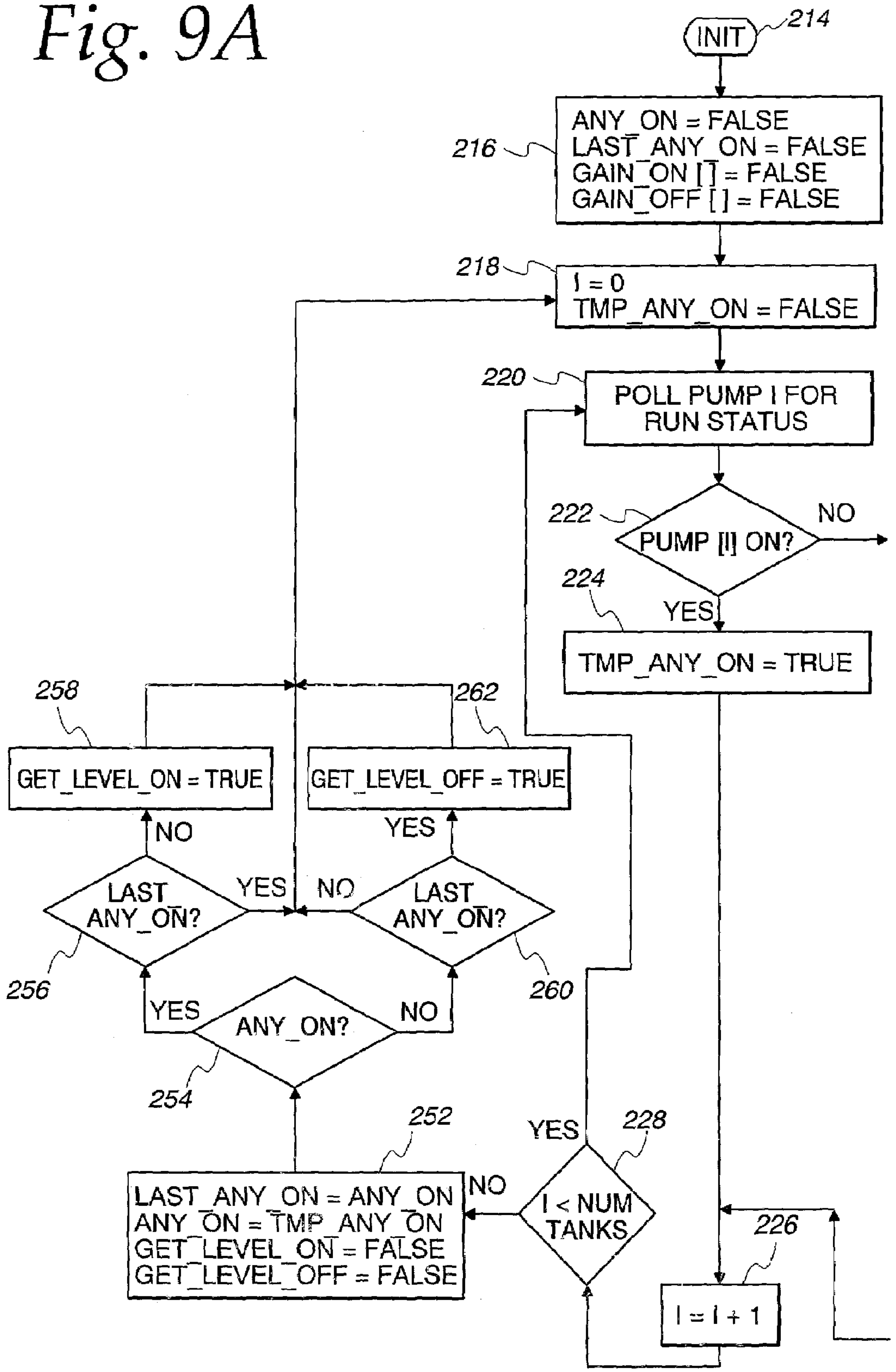

FIGS. 3-9B are software flaw diagrams which illustrate enhanced functional and diagnostic capability for a fuel delivery system heretofore unknown. In particular. FIG. 3 is a software flow diagram for monitoring pump controller faults. FIG. 4 is a software flow diagram which relates a system for providing an automated response to an empty tank fault. FIG. 5 is a software flow diagram for distinguishing a line leak from a motor controller fault. FIG. 6 is a software flow diagram for use in pressure transducer testing. FIG. 7 is a software flow diagram for pressure transducer testing with a variable frequency pump controller. FIG. 8 is a software flow diagram for automatic line leak calibration. FIGS. 9A and 9B represent a software flow diagram for a faulty relief valve diagnosis system for manifolded tanks.

Referring to FIG. 3, a system for monitoring pump controller faults is illustrated. In particular, pump controller faults are known to be indicated visibly or audibly on the pump controller itself. Ideally, controller faults are manually noted and logged. However, situations are known in which station attendants simply reset the controller without manually logging the faults thereby causing the fault history to be lost.

FIG. 3 illustrates a system for automatically resolving such a problem. In particular, an array, CTRLR[I], is used to store the fault status of all controllers 38, 40 in communication with the integration unit 48. During initialization, each of the controller values in the array CTRLR[I] is set to a value indicating no fault. More particularly, the system is initiated as indicated in step 74. After initialization, the value I is set to zero in step 76. Next, in step 78, the value of the controller corresponding to CTRL[0] is set to NO FAULT. Subsequently, the value I is incremented by one in step 80. The system checks in step 82 to ascertain whether all of the controllers have been initialized to a NO FAULT value. In particular, if I is less than the total number of controllers, the system loops back to step 78 and continues setting the values in the array CTRL[I] to a NO FAULT value. Alternatively, if it is determined in step 82 that all of the values in the array CTRLR[I] have been initialized to a value equal to a NO FAULT value, the system proceeds to the main loop in which each of the controllers are sequentially polled. Initially, the value I is set to zero in step 84 and the controller corresponding to that value is polled in step 86. In the main loop, each controller is continuously polled for fault status. Upon initial detection of a fault, the system sets the corresponding controller value CTRLR[I] to a fault value and logs the fault value to non-volatile memory 58 (FIG. 2). In particular, the system checks the fault status in step 88. If a fault is detected, the system first checks if the current value of the controller CTRLR[I] is set to the no fault value in step 90. If so, the controller is set to a fault value in step 92 and logged to non-volatile memory 58 in step 94 so that it can be retrieved later for diagnostic purposes.

If the fault is an under load fault 96, which means that the storage tank is empty, as determined in step 96, a message is sent in step 98 to order fuel. If the fault is not an under load fault, a request service message is sent in step 100. After sending a message, the system waits for the faulted controller to be reset while continuing to poll the pump controllers 38, 40. Thus, if pump controller is set to a NO FAULT value in step 102. The variable I is subsequently incremented in step 102 to move on to the next controller. The system checks in step 104 whether all of the controllers have been polled. Thus, the system checks whether I is less than the total number of controllers in step 104. If so, the system loops back to step 86, if no the system loops back to step 84.

FIG. 4 relates to an aspect of the invention which provides enhanced functionality and diagnostic capability relatively to known systems. In particular, known systems are unable to detect false underload conditions which require manual reset of the pump controller. In order to resolve this problem, the system in accordance with the present invention is able to detect a false underload fault as well as automatically reset the pump controller. In particular, with reference to FIG. 4, the system is initialized in step 106 and iteratively polls all of the pump controllers in steps 108, 110, 112, 114 and 116. In particular, the variable I is set to zero in step 108. During the first iteration, the first controller 38, 40 is polled for fault status in step 110. The system then determines in step 112 whether the fault status corresponds to a empty tank status. If not, the next controller is polled and the variable I is incremented in step 114. The system checks in step 116 to determine if all of the controllers have been polled. Thus, if I is less than the total number of controllers, as determined in step 116, the system loops back to step 110 and continues iteratively polling the various pump controllers 36, 38. Once all the controllers have been polled, the system returns to step 108 and repeats the process.

If an empty tank fault condition is indicated by one of the controllers 38, 40 in step 112, the tank gauge 46 is polled in step 118 for its status. If the tank gauge 46 indicates that fuel is being delivered in step 120, as indicated by a rapidly rising level, the system resets the controller 38, 40 in step 122 and loops back to step 116. If fuel is not being delivered, as indicated in step 120, the system checks for a low level alarm in step 124. If a low level alarm is indicated in step 124, the system returns to step 116 and continues iteratively polling the pump controller 36, 38. If a low level alarm is not indicated, a message that the pump is too far from the bottom is sent in step 126. By sending the message in step 126, adjustments can be made, so that the fuel below the pump level can be utilized. Also, in step 127, in response to no low level alarm, the level of the low level alarm in the tank gauge is reset so a low level alarm is generated prior to the shutdown of the pump 34, 36 by an associated pump controller 36, 38 as a result of an empty tank condition. In particular, the tank gauge low level alarm limit is automatically adjusted to a level higher than the level in which the associated pump controller 38, 40 trips off as a result of an empty tank condition. After the message is sent in step 126 and the low level alarm adjusted in step 127, the system returns to step 116 and iteratively polls additional pump controllers 38, 40 in the system.

An exemplary electronic line leak detection system is a Model No. LS300 Auto Learn, available from EBW, Muskegan, Mich. When line leak detection systems are under test, the pump 34, 36 is turned on and pressure changes are observed. If the pump controller 38, 40 is faulted, the pump 34, 36 will not turn on and there will be no corresponding pressure change. In such a situation, the line leak detection system may incorrectly indicate a leak.

In order to resolve this problem, the system as illustrated in FIG. 5, repeatedly loops through all of the lines with electronic line leak detection. During each iteration, the system polls the tank gauge 46 for the status of each line. In particular, with reference to FIG. 5, the system is initialized in step 128 and the variable I set to zero in step 130 to reset the system. The tank gauge 46 is polled for the first line in step 132. In step 134, the system checks for a line leak. If no line leak is indicated, the line number is incremented in step 136 and the next line is checked. The system then checks in step 138 to determine if I is less than the total number of lines available. If so, the system loops back to step 132 and polls another line. If not, the system loops back to step 130 and repeats the process. If a line leak is detected, as indicated in step 134, the corresponding controller 38, 40 is polled in step 140 for faults. If the controller 38, 40 is faulted, as determined by step 142, a message is sent in step 144 indicating a controller fault. Afterwards, the system loops back to step 136. If there is no controller fault, a message is returned indicating a line leak in step 146. Thus, the system as illustrated in FIG. 5 is easily able to discriminate between a line leak and a false line leak indicated by a controller fault.

The system illustrated in FIG. 6 relates to eliminating false diagnostics relating to pressure transducers. In particular, when pressure transducers fail, such transducers normally indicate a constant pressure. Accordingly, conventional diagnostic techniques for checking a pressure transducers relate to turning on a pump and monitoring the pressure change. However, if the pump controller is faulted, the pump will not turn on, thus causing the pressure to remain constant resulting in a false indication of a faulty pressure transducer. In order to resolve this problem, the system repeatedly loops through all the lines with electronic line leak detection. In particular, the system is initialized in step 148 with the variable I set to zero in step 150. In step 152, the tank gauge 46 is polled for the first line dispenser RUN command from the dispenser 28 and the line pressure. The system then checks for a RUN command from the dispenser 28 in step 154. If the run signal from the dispenser 28 is indicated step 154, the transducer test is not performed and the variable I is incremented to the next value corresponding to the next line in step 156. The system then checks in step 158 whether all of the lines have been polled. If not, the system loops back to step 152. If so, the system loops back to step 150.

If the tank gauge indicates a RUN signal is not present from the dispenser in step 154, the pump controllers 38, 40 are polled in steps 160 and 162 for fault status. If the pump controller 38, 40 indicates a fault in step 162, the system loops back to step 156 and increments the variable I and polls the next line. If the pump controller 38, 40 for the line I is not faulted, as indicated in step 162, a pump controller RUN command is sent to the pump controllers 38, 40 in step 164. Subsequently, the tank gauge 46 is polled in step 166. The system then determines in step 168 whether the pressure has changed. If not, a message indicating a transducer failure is issued in step 170. Alternatively, the system returns back to step 156.

FIG. 7 is similar to FIG. 6, but for a configuration in which the pump controller 38, 40 is a variable frequency pump controller. With such a system, the pump frequency is not constant. In such a system, the system repeatedly loops through all the lines with an electronic line leak detection system. More particularly, the system is initialized in step 172 and a variable I is set to zero in step 174. The tank gauge 46 for the first line I is polled in step 176 for a RUN signal. The system determines in step 178 whether a RUN command has been issued for the line. If so, the next line is checked and the variable I is incremented in step 180. If less than all of the lines have been checked, as determined in step 182, the system loops back to step 176. Otherwise the system loops back to step 174 and repeats the entire process. If the run signals are indicated, the test is not performed.

If a run signal is not indicated as determined in step 178, the pump controller for line I is polled for its fault status and controller type in step 184. The controller type is returned from the controllers 38, 40 in response to a TYPE command. The system determines in step 186 the fault status of the pump controller 38, 40 and whether or not it is a variable frequency pump controller. If the system is faulted or not a variable frequency pump controller, the system loops back to step 180. However, if the system is not faulted and the controller is a variable frequency controller, the pump controller 38, 40 is commanded to regulate the pressure at a value X in step 188. The tank gauge 46 is then polled in step 190 for the pressure of line I. If the pressure indicated by the line leak subsystem or the tank gauge 46 does not equal the command pressure X within a tolerance Y, as determined in step 192, a message is sent in step 194 indicating a transducer failure. Otherwise the system simply loops back to step 180.

As mentioned above, EPA regulations require all fuel storage systems to include automatic leak detection. Calibration of such line leak systems require manual insertion of a calibrated leak. Since line characteristics can change over time, the line leak detection system can malfunction. The system solves this problem as illustrated in FIG. 8. The system is initialized in step 196. Subsequently, the solenoid valve 30, 32 in the pump manifold 26 is periodically closed by way of a relay output of the tank gauge 46 in step 198. Opening of the solenoid valve 30, 32 inserts a calibrated leak into the line. The calibration interval is part of the tank gauge setup, as indicated in step 200. In each calibration interval, the tank gauge 46 waits for the absence of a RUN command from the dispenser 28 in step 202. In the absence of a RUN command, the solenoid valve 30, 32 is opened in step 204. Subsequently, in step 206, a line leak subsystem CALIBRATE command is issued. While waiting for the calibration to complete, as indicated in steps 208 and 210, the system monitors for a RUN command. If a RUN command is detected, the calibration is restarted after the RUN command is removed, as indicated in step 212. When the calibration is complete, the solenoid valve 30, 32 is closed and the calibration interval timer is restarted.

If a tank 22, 24 is gaining level, the tank gauge 46 may indicate a leak, just as if the tank is losing level. The reason for this is because water may be coming into the tank if the water table is higher than the fuel level in the tank. In a manifolded system, the piping from the two tanks is connected as illustrated in FIG. 1. Check valves with associated pressure relief valves may be provided, for example, as disclosed in FE Petro Technical Bulletin, TB010, October 2001 with the electronic leak detection system for each pump. As such, if one pump is on, it is possible for fuel to enter the other tank if there is a faulty relief valve associated with the pump that is not on, which may be falsely interpreted as a leak by the tank gauge.

This system can be resolved by the system illustrated in FIGS. 9A and 9B. As used therein, the variable ANY_ON indicates whether any pump 34, 36 in the manifolded group is on. The variable LAST _ANY _ON is used on conjunction with the variable ANY_ON to determine the point at which the pump 34, 36 in a manifolded group turns on or all the pumps 34, 36 in a manifolded group have been turned off. Elements of the any CAIN_ON indicate whether or not a inapifolded tank 22, 24 has gained level while its pump 38, 40 was off and other pumps 38, 40 in the manifolded system are on. Elements of the array GAIN_OFF indicate whether a inanifolded tank 22, 24 has gained level while all pumps 34, 36 in the manifolded system are off. The system iteratively checks through all of the ranks 22, 24 in the manifolded group. During each iteration, the system polls the pump controllers 38, 40 in a manifolded group for its RUN status. If a pump controller 38, 40 is running, the test for that pump 34, 36 is not performed; otherwise, it keeps track of the levels in the tank 22, 24 when other pumps in the manifolded group are turned on and off. If the tank 22, 24 is gaining level when other pumps 34, 36 are on and is not gaining level when other pumps are oft message is sent indicating a faulty relief valve.

Turning to FIG. 9A and 9B, the system is initialized in step 214. In step 216, the system variables ANY_ON; LAST_ANY_ON, as well as the arrays GAIN_ON[ ] and GAIN_OFF[ ], are initialized and set to a value of a logical zero or false. Next, in step 218, the system sets the variable TMP_ANY_ON to a logical zero. The system then polls the first pump to determine if the first pump is running in step 220. If the first pump is running, as determined in step 222, the variable TMP_ANY_ON is set to a logical one or true in step 224. The system then increments the value of I in step 226 to poll the next pump. In step 228, the system checks whether the value for 1 is less than the number of tanks (NUM_TANKS). Since there is normally one pump provided per tank, if I is less than the number of tanks, the system loops back to step 220 to poll the other pumps in the system. Steps 222, 224 and 226 are repeated until all of the pumps have been polled.

If it is determined in step 222 that a pump is off, and in step 226 that at least one pump just turned on, the system polls the tank gauge 46 in step 228 to obtain the tank level when one or more pumps 34, 36 just turned on In step 230, the level at turn on is evaluated to determine if it was greater than the level at turn off plus a tolerance X. If so, the system indicates that the tank 22, 24 is gaining level while the pumps 34, 36 are off in step 232. Otherwise, the system indicates in step 234 that the tank 22, 24 is not gaining level while the pumps are off. In step 236, the system determines whether the tank 22, 24 is gaining level while other pumps are on. If so, a relief valve failure is indicated in step 238. If not, the system proceeds to step 240 to obtain the level when all pumps have been turned off. In particular, when all pumps are turned off, the tank gauge 46 is polled in step 242. The system then checks in step 244 to determine whether the level at turn off is greater than the level at turn on plus a tolerance. If so, this assumes that the tank 22, 24 is gaining level while the other pumps 34, 36 are on. If it is determined that the tank 22, 24 level is greater than the level at turn on plus a tolerance X, the system indicates in step 246 that the tank 22, 24 is gaining level while the other pumps are on. Next, in step 248, the system determines whether the tank 22, 24 is gaining level while all of the pumps are off. If not, a pump [I] relief valve failure is indicated in step 250. If so, the system returns to step 226 and repeats the loop. Alternatively, if it is determined in step 244 that the tank 22, 24 is not gaining level when the other pumps are on, the variable GAIN_ON[I] is set equal to a logical zero or false and returned to step 226. After each iteration of the loop, the system proceeds to step 252 where the variable LAST_ANY_ON is set equal to the variable ANY_ON; the variable ANY_ON is set equal to TMP_ANY_ON; and the variable GET_LEVEL_ON is set to a logical zero or false and the variable GET_LEVEL_OFF is also set to false.

The system checks in step 254 whether any of the pumps are on. If so, the system checks in step 256, to determine if any pumps were on during the last iteration through steps 220, 222, 224, 226, 228. If not, the variable GET_LEVEL_ON is set equal to a logical one or true in step 258 and the system loops back to step 218. If so, the system loops directly back to 218. Alternatively, if the system determines that no pumps are on, as determined in step 254, the system checks in step 260 whether any pumps were on during the last iteration through steps 220, 222, 224, 226, 228. If so, the variable GET_LEVEL_OFF is set equal to a logical one or true in step 262 and the system loops back to step 218. Alternatively, if the last pump was not on the system loops directly back to step 218.

Obviously, many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

We claim:

1. A control system for a fuel delivery system which includes at least one storage tank and at least one storage tank gauge and at least one pump controller, the control system for monitoring the at least one storage tank gauge and the at least one pump controller, the control system comprising:

an integration unit which includes a processor, memory, said integration unit configured to communicate with said at least one pump controller and said at least one tank gauge, wherein said integration unit is configured to receive an empty tank signal from said at least one pump controller, said integration unit configured to detect whether said empty tank signal is false by polling said a least one tank gauge in order to detect the fuel level in said storage tanks after said empty tank signal is detected and reset said at least one pump controller and clear said empty tank signal when the fuel level in said at least one storage tank is above a predetermined level.

2. The control system as recited in claim 1, wherein said integration unit is configured to automatically determine a false empty tank condition resulting from one of said one or more pumps being located more than a predetermined distance from the bottom of the tank.

3. The control system as recited in claim 2, wherein the integration unit is configured to provide an automated response to said false empty tank condition.

4. The control system as recited in claim 3, wherein the integration unit is configured to automatically reset said at least one pump controller the was tripped off as a result of said false empty tank signal.

5. The control system as recited in claim 4, wherein the integration unit is further configured to detect whether said tank gauge indicates a low-level alarm.

6. The control system as recited in claim 5, wherein said integration unit is further configured to automatically send error messages when a low level alarm has been generated after a false empty tank condition has been detected.

7. The control system as recited in claim 4, wherein said integration unit is configured to poll said one or more tank gauges and to automatically adjust the tank gauge low level alarm when an empty tank condition exists.

8. The control unit as recited in claim 1, wherein said integration unit is configured to poll the status of said one or more pump controllers and said one or more tank gauges.

9. The control unit as recited in claim 8, wherein one or more diagnostic messages are provided as a function of the status of said one or more pump controllers and said one or more tank gauges.

10. The control unit as recited in claim 9, wherein said one or more messages are provided as a function of at least one of said one or more tank gauges indicating a leak status and at least one of said pump controllers indicating a fault status.

11. A control system for a fuel delivery system having one or more tank gauges, and one or more pump controllers and a pressure transducer, the control system comprising:

an integration unit which includes a processor, memory, and a plurality of communication interfaces, said integration unit configured to communicate with said one or more pump controllers and said one or more tank gauges to provide diagnostics as a function of the status of said one or more tank gauges and the status of said one or more pump controllers, wherein said control unit is configured to test for a pressure transducer failure and wherein the determination of the pressure transducer failure includes polling the pump controllers and determining the status of faults of said pump controllers.

12. The control system as recited in claim 11, wherein at least one of said one or snore controllers is a variable frequency controller.

13. A control system for a fuel delivery system having one or more pump controllers and one or more tank gauges having a normal mode of operation and fault mode, the control system comprising:

an integration unit having a processor, memory including non-volatile memory, said integration unit configured to automatically monitor the fault mode of said one or more pump controllers and automatically log the fault mode of at least one of said pump to said non-volatile memory wherein said integration unit is configured to automatically detect if a controller fault is under load and to send a signal indicative that service is required if the controller fault is not under load.

14. A control system for a fuel delivery system including a storage tank one or more pump controllers, one or more tank gauges and a leak detection system having a solenoid valve, wherein said leak detection system is configured to provide a calibrated leak when said solenoid valve is open, the control system comprising;

an integration unit having a processor, and one or more communication interfaces, the control system configured to operate a said solenoid valve to enable calibration of said leak detection system and generate a line leak signal, wherein said integration unit is configured to open said solenoid to verify that said line leak detection system is operational.

15. A control system for a fuel delivery system having at least one tank gauge and at least one pump controller, the control system comprising:

an integration unit which includes a processor, processor and a memory and a plurality of second communication links between said integration unit and said one or more pump controllers for controlling one or more pumps and said one or more tank gauges located in one or more storage tanks, said integration unit configured to communicate with said one or more pump controllers and said one or more tank gauges to distinguish between a line leak condition and a pump controller fault condition by checking said at least one pump controller and determining that said link leak condition is false when a pump controller fault is detected.

16. A control system for a fuel delivery system having one or more tanks manifolded together, a pump and a leak detection system provided for each tank, said leak detection system including a valve, one or more valve tank gauges, one or more pumps and one or more pump controllers, the control system comprising:

an integration unit which includes a processor, memory for controlling one or more pumps and said one or more tank gauges located in one or more storage tanks, said integration unit configured to communicate with said one or more pump controllers and said one or more tank gauge, said integration wilt configured to detect a tank leak and to further detect whether said tank leak is due to a condition when said valve is leaky by polling said pump controllers and determining whether said pumps are on when said tank guage indicates a leak and generating a leaky valve signal as a function of said tank level and the status of said pumps.

* * * * *

UNITED STATES PATENT AND TRADEMARK OFFICE

CERTIFICATE OF CORRECTION

PATENT NO. : 7,260,499 B2
APPLICATION NO. : 10/224126
DATED : August 21, 2007
INVENTOR(S) : Watzke et al.

It is certified that error appears in the above-identified patent and that said Letters Patent is hereby corrected as shown below:

At Column 11, line 6, “wilt” should be -- unit --.

Signed and Sealed this

Twenty-ninth Day of April, 2008

JON W. DUDAS
*Director of the United States Patent and Trademark Office*

UNITED STATES PATENT AND TRADEMARK OFFICE

CERTIFICATE OF CORRECTION

PATENT NO. : 7,260,499 B2
APPLICATION NO. : 10/224126
DATED : August 21, 2007
INVENTOR(S) : Watzke et al.

It is certified that error appears in the above-identified patent and that said Letters Patent is hereby corrected as shown below:

In Claim 8, Column 9, Line 59, delete “The Control unit” and insert --The control system--.

In Claim 9, Column 9, Line 62, delete “The Control unit” and insert --The control system--.

In Claim 10, Column 9, Line 66, delete “The Control unit” and insert --The control system--.

Signed and Sealed this

Eighteenth Day of November, 2008

JON W. DUDAS
*Director of the United States Patent and Trademark Office*

UNITED STATES PATENT AND TRADEMARK OFFICE

CERTIFICATE OF CORRECTION

PATENT NO. : 7,260,499 B2
APPLICATION NO. : 10/224126
DATED : August 21, 2007
INVENTOR(S) : Donald Edward Watzke, Jr. et al.

It is certified that error appears in the above-identified patent and that said Letters Patent is hereby corrected as shown below:

Claim 16, Column 12, Line 3, delete “guage” and insert --gauge--

Signed and Sealed this
Twenty-third Day of August, 2011

David J. Kappos
*Director of the United States Patent and Trademark Office*